(12) United States Patent
Popov

(10) Patent No.: US 6,967,424 B2
(45) Date of Patent: Nov. 22, 2005

(54) ROTOR ASSEMBLY AND STATOR ASSEMBLY FOR AN ELECTRICAL MACHINE

(75) Inventor: Vladimir Vladimirovich Popov, Königsfeld (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/758,109

(22) Filed: Jan. 16, 2004

(65) Prior Publication Data

US 2004/0217667 A1 Nov. 4, 2004

(30) Foreign Application Priority Data

Feb. 18, 2003 (EP) .................................. 03003690

(51) Int. Cl.[7] .......................... H02K 1/17; H02K 21/12
(52) U.S. Cl. ............ 310/216; 310/156.53; 310/156.56; 310/156.57
(58) Field of Search ................. 310/216, 254, 310/156.53, 156.56, 156.57, 156.74, 156.76, 310/51

(56) References Cited

U.S. PATENT DOCUMENTS

| | | | |
|---|---|---|---|
| 4,504,755 A | 3/1985 | Semones et al. | |
| 4,933,584 A * | 6/1990 | Harms et al. | 310/162 |
| 5,086,245 A | 2/1992 | Sieja et al. | |
| 5,173,651 A * | 12/1992 | Buckley et al. | 318/701 |
| 5,773,908 A * | 6/1998 | Stephens et al. | 310/254 |
| 6,087,752 A * | 7/2000 | Kim et al. | 310/156.51 |
| 6,147,428 A * | 11/2000 | Takezawa et al. | 310/156.57 |
| 6,744,171 B1 * | 6/2004 | Kolomeitsev | 310/254 |
| 6,853,105 B2 * | 2/2005 | Nakano et al. | 310/156.47 |

FOREIGN PATENT DOCUMENTS

| | | |
|---|---|---|
| DE | 10100718 | 7/2002 |
| EP | 0375228 | 6/1990 |
| EP | 0641059 | 4/1998 |
| EP | 0691727 | 5/1998 |
| EP | 0872944 | 10/1998 |
| EP | 0955714 | 11/1999 |
| EP | 0803962 | 9/2000 |
| GB | 1177247 | 1/1970 |

* cited by examiner

*Primary Examiner*—Tran Nguyen
(74) *Attorney, Agent, or Firm*—Duane Morris LLP

(57) ABSTRACT

The present invention relates to a rotor assembly for an electrical machine, comprising: a rotor body of generally cylindrical shape having a substantially cylindrical surface configured for facing an air-gap between the rotor assembly and a stator of the electrical machine, and permanent magnets embedded in said rotor body, wherein grooves are formed in said air-gap facing surface for manipulating the distribution of magnetic flux created by said permanent magnets.

32 Claims, 5 Drawing Sheets

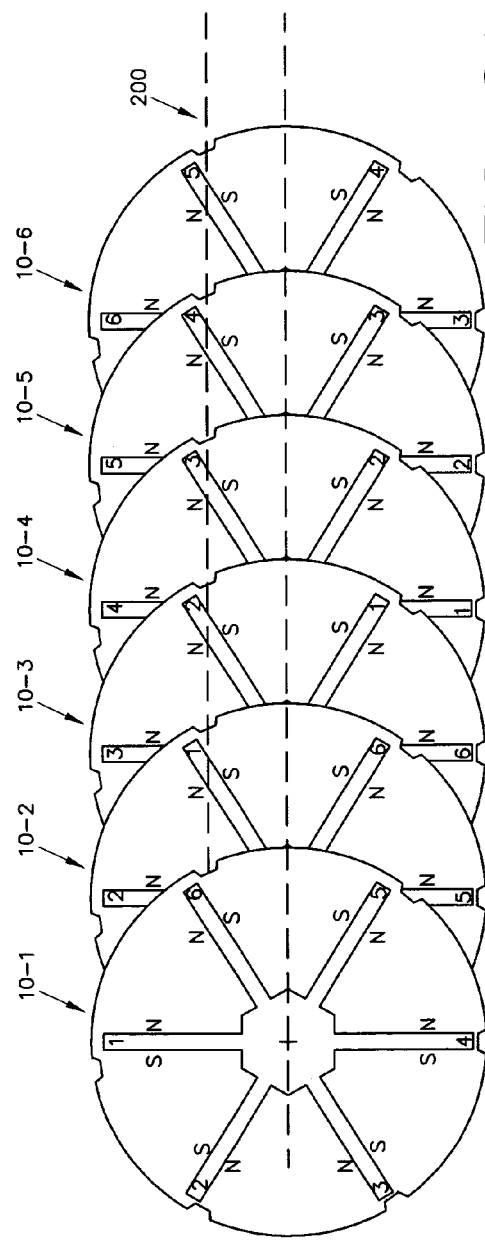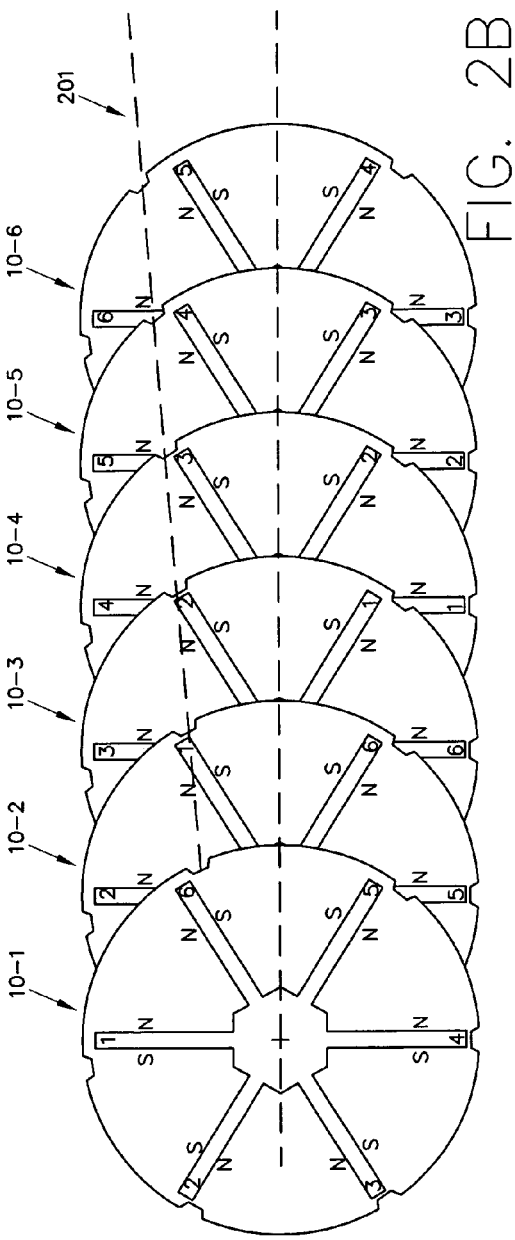

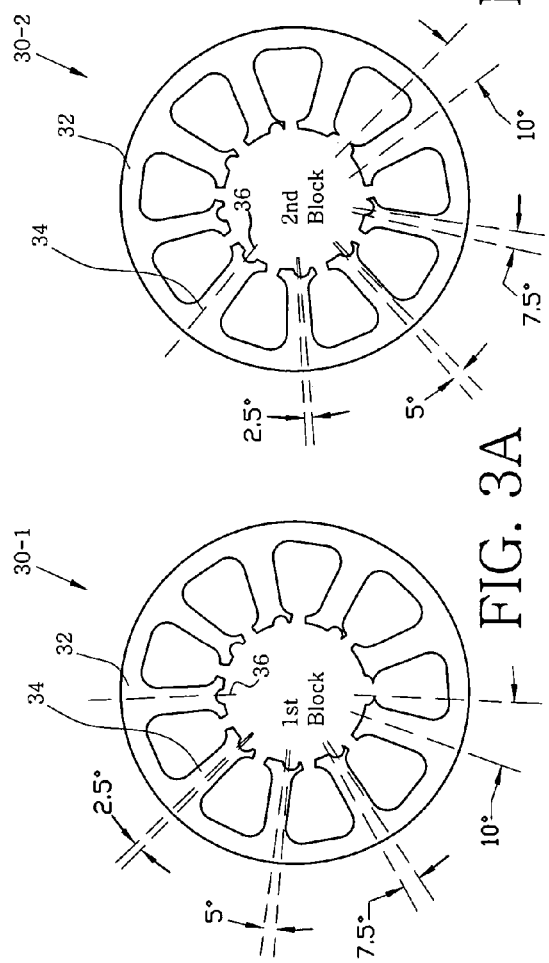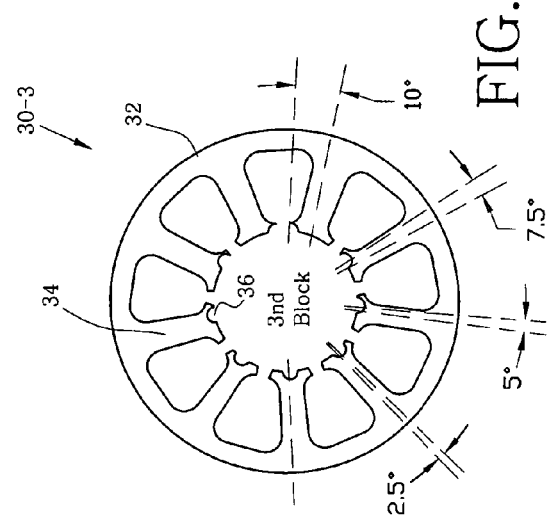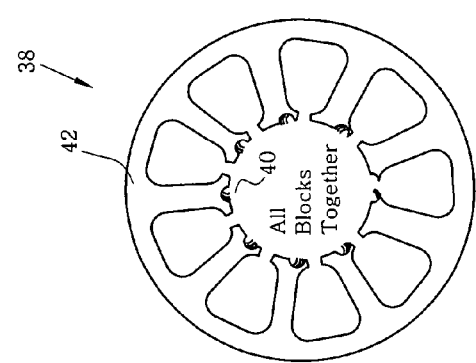

ROTOR ASSEMBLY AND STATOR ASSEMBLY FOR AN ELECTRICAL MACHINE

This disclosure claims the filing date benefit of European Patent application No. 03 003 690.9 filed Feb. 18, 2003.

FIELD OF THE INVENTION

The present invention relates to a rotor assembly and a stator assembly of an electrical machine, in particular a permanent magnet (P.M) electrical machine comprising such a rotor assembly or stator assembly. In general, the invention relates to the field of electrical motors comprising permanent magnets which can be configured to include an inner rotor surrounded by a stator (Innenläufermotor) or an outer rotor configuration (Außenläufermotor). Electrical machines having an interior rotor include a rotor assembly which is mounted on the rotor shaft and one or more permanent magnets as well as a stator assembly, such as a stator laminated from a number of metal sheets, comprising windings. The rotor assembly is coaxially inserted into the stator assembly. In electrical machines having outer rotors, the rotor assembly surrounds the stator.

BACKGROUND OF THE INVENTION

FIG. 5 schematically shows the general design of an electrical machine, comprising a housing 114, in which are included the stator assembly 118, the rotor assembly 116 as well as bearings 126, 128 for rotatably supporting the rotor assembly. The stator assembly 118 comprises sheet metals 155 and windings 160 and defines an interior cavity into which the rotor assembly 116 can be inserted. The rotor assembly 116 includes the shaft 110, a yoke 112 and permanent magnets 122. The bearings 126, 128 for the rotor assembly can be integrated into a flange 124 of the motor housing 114.

More particularly, the present invention relates to a rotor assembly for an electrical machine, comprising a body of generally cylindrical shape and permanent magnets embedded in said body. The invention also relates to a stator assembly comprising a stator body of generally cylindrical shape having a stator yoke and stator poles.

Rotors including embedded magnets have been generally known and described in the art. A rotor configuration having a multi-pole "spoke" design with radially extending embedded magnets, enclosed by a retaining ring is shown e.g. in "Design of Brushless Permanent-Magnet Motors" J. R. Hendershot Jr. and T J E Miller, Magna Physics Publishing and Clarendon Press, Oxford, 1994. As shown therein, it is known to have a rotor body with embedded, radially extending magnets which are protected by a ring or tube surrounding the rotor body. The rotor body in which the magnets are embedded has the function of a yoke.

A common form of buried magnets is shown in EP 0 641 059 B1 and EP 0 691 727 B1. These references show a plurality of magnets which are inserted into slots which are formed in the outer rotor surface. With the design disclosed in these references, stray flux is created which passes through the rotor back-iron close to the shaft. Accordingly, magnet energy dissipated in this area can't be used efficiently. Document DE 101 00 718 A1 discloses a similar design wherein the permanent magnets are inserted into slots in the rotor body which are closed at the outer rotor surface. Thereby, the rotor is divided into sectors which need to be mounted on a frame.

WO 00/57537 describes a multipole, permanent-magnet rotor for a rotating electrical machine, manufactured with embedded magnets in a so-called "flux-concentrating style". In the rotor configuration shown in this reference permanent magnets are designed as flat cubes which are arranged in a direction radial to the rotor axis in groove-like gaps between yoke sections fixed in the rotor body. For easily mounting the magnets this document proposes to divide a yoke into two adjacent half-yokes of two poles, wherein magnets are arranged there between to form a pole element which can be fixed independently on the rotor body.

EP 0 872 944 A1 shows another design of a rotor having embedded permanent magnets wherein the magnets are arranged in a radial direction or parallel to a radial direction of the rotor body.

A similar design is shown in EP 0 803 962 B1. The rotor is made of a ferromagnetic material body defining a plurality of radially by extending slots in which are engaged the permanent magnets so as to provide the desired numbers of poles for the rotor. The slots for receiving the permanent magnets are designed with a bridge at the outer periphery of the rotor body and an opening at the inner diameter of the rotor body so that the permanent magnets can be inserted and held in said slots. Trapezoidal elements of the rotor body which are separated by the radially extending slots will form the poles of the rotor.

Further patent documents showing a rotor having embedded magnets are GB 1,177,247, EP 0 955 714 A2 and U.S. 2002/0067096 A1.

Also stator arrangements comprising a stator yoke and a plurality of stator poles for an inner-rotor or outer-rotor motor design are generally known in the art.

The preferred application of the rotor assembly and the stator assembly according to the present invention is in a brushless D.C. motor or permanent magnet synchronous motor. Such motors can be used in a wide range of applications such as spindle motors for disc drives, electrical motor power assisted systems in automobiles, e.g. steering and braking systems, power tools and many other applications.

With the radial arrangement of the permanent magnets and the stator poles, as shown and described in the prior art, a problem may arise in that the regular arrangement of the permanent magnets and stator poles produces a cogging torque effect which is disadvantageous in the operation of the permanent magnet motor. In a rotor assembly having surface-magnets, it is known to provide a skewed magnet arrangement to avoid abrupt switching between faces and thus to reduce a cogging torque, as disclosed e.g. in the above mentioned reference of Hendershot and Miller. Skewed magnetization of the rotor poles, however, creates an axial component of the magnetic force and thus a loss of torque. Further, the problem of the cogging torque produced during operation of the permanent magnet motor has not yet been solved satisfactorily for rotors having embedded magnets of the type described above. In fact, one of the biggest technological disadvantages of a motor design comprising embedded or buried magnets is that it appears to be virtually impossible to skew the rotor assembly, physically or magnetically, so that an existing cogging torque can be reduced only by design optimization, or skewing the stator.

Skewing of the stator usually means that the stator poles have to be deformed so that it will be more difficult to apply the stator windings onto the skewed stator.

A further approach for reducing the cogging torque effect in an electrical machine comprising embedded magnets known in the prior art is the application of a so-called Broadbent shift, introduced by Andrew Broadbent, Evershed & Vignoles, 1998. In the Broadbent technique, permanent magnets are cut into N subsections, each section progressively displaced from its neighbours by an angle of 1/N of a stator slot pitch. This leads to cancelling of harmonics in the cogging torque wave form. The "Broadbent shift" requires cutting the magnets into pieces in the axial direction which leads to significant difficulties during the manufacture and assembly procedure of the rotor assembly.

It is therefore an object of the present invention to provide a rotor assembly for an electrical machine having embedded magnets which can improve the efficiency of the electrical machine and, in particular, eliminate or reduce the cogging torque. The present invention, in general, aims at improving motor operation and, in particular, eliminating or reducing the cogging torque. For this purpose, it is also an object of the present invention to provide an improved stator assembly which fulfils this object.

SUMMARY OF THE INVENTION

This problem is solved by a rotor assembly comprising the features of claim 1. The present invention also provides a stator assembly according to claim 6.

According to the present invention a rotor assembly for an electrical machine is provided, comprising a rotor body of generally cylindrical shape having an substantially cylindrical surface configured for facing an air-gap between the rotor assembly and a stator of the electrical machine, and permanent magnets embedded in said rotor body. In the air-gap facing surface of the rotor body grooves are formed for manipulating the distribution of magnetic flux created by said permanent magnets. By providing grooves in the air-gap facing surface of the rotor body, it is possible to control the flux concentration of the magnetic flux created by the permanent magnets, passing from the rotor assembly through the air-gap to the stator. By controlling the flux concentration or flux distribution the cogging torque can be reduced. The operation of the electrical machine thus can be tuned by choosing an appropriate shape of the grooves in the air-gap facing surface of the rotor body.

In one embodiment of a rotor assembly having embedded magnets, the magnets extend substantially radially through the rotor body. According to the present invention, the grooves preferably are provided in the neighbourhood of the end faces of at least some of the permanent magnets. For effectively reducing the cogging torque, it is preferred that skewed grooves are formed in said air-gap facing surface of the rotor body which extend along the length of said surface with a predefined angle to the axial line in the axial direction of the rotor body. By providing such skewed grooves, the present invention can reduce the cogging torque down to acceptable values without any additional technological or material expenses. The grooves in the air-gap facing surface of the rotor body, when appropriately designed and placed, are sufficient to manipulate the distribution of the magnetic flux to optimise the motor operation.

It should be noted that the present invention can be applied to any type of a permanent magnet electrical machine rotor having any embedded magnet arrangement, which allows to make the grooves on the rotor surface. For example, the magnets can be arranged radially or substantially parallel to the circumference of the rotor in a polygon or a combination of such arrangements may be used.

In a preferred embodiment of the invention, the rotor body is formed by a plurality of cylindrical laminations, each lamination having an air-gap facing surface corresponding to the air-gap facing surface of the rotor body. Shallow slots or notches are formed at a regular or irregular interval in the air-gap facing surfaces of the laminations, wherein said laminations are arranged on top of each other such that the shallow notches are not perfectly aligned. Preferably, said laminations are arranged to form said skewed grooves from said misaligned shallow slots.

Based on that same inventive concept, the present invention also provides a stator assembly for an electrical machine, comprising a stator body of generally cylindrical shape having a stator yoke and stator poles, said stator poles having end faces facing an air-gap between the stator assembly and a rotor of the electrical machine. In the end faces of the stator poles, grooves are formed for manipulating the distribution of magnetic flux created between said stator body and said rotor of the electrical machine. The grooves in the end faces of the stator poles have a similar effect as the grooves in the air-gap facing surface of the rotor body for manipulating the air flux distribution and thus, by appropriately arranging the grooves, reducing or eliminating the cogging torque effect.

According to this aspect of the present invention, skewed grooves are formed in said end faces of the stator poles which extend along the length of said end faces with a predefined angle to the axial line in the axial direction of the stator body, as explained above with respect to the rotor assembly.

Preferably, the stator body is formed from a plurality of laminated sheets, each sheet including an axial yoke section and axial stator pole sections, wherein shallow slots or notches are formed at a regular or irregular interval in the end faces of the pole sections, wherein said laminated sheets are arranged on top of each other such that the notches are not perfectly aligned. Preferably, said laminated sheets are arranged so as to form the skewed grooves from said misaligned notches.

While the prior art arrangement of embedded magnets provided for only two degrees of freedom for controlling motor parameters, such as the radial distribution of the electromagnetic induction of the air-gap and flux concentration, namely the widths of each magnet and the height of each magnet, the present invention allows further parameters for motor tuning. According to the present invention, the motor can be tuned as a function of the width, length and inclination angle of the skewed grooves in the air-gap facing surface of the rotor body or the stator poles. Therefore, it is easier to influence the flux concentration and distribution of the electromagnetic induction in the air gap as with the arrangements according to the prior art. By optimising the size, shape and position of the grooves it is possible to reduce the cogging torque without the necessity of any skewing technique which has been used in the prior art. The design of the grooves will depend on the design of the motor. Presently preferred values of the inclination or shifting angle to the axial line are between 10 and 60 degrees, preferably between 20 and 40 degrees.

According to the present invention, the magnets preferably are disposed in slots provided in the rotor body. At the outer periphery of the rotor body, the slots are closed by bridges which protect the magnets against possible mechanical and electromagnetic damage and which connect the poles on the two sides of each magnet. However, these bridges conduct a large portion of stray flux. Therefore, the thickness of the bridges has to be designed carefully to satisfy both requirements regarding protection of the permanent magnets and reduction of stray flux.

According to the present invention, there is no retaining tube necessary for protecting the permanent magnets and holding the permanent magnets in place. Accordingly, the size of the air-gap can be reduced and the energy from the magnet can be transferred more efficiently to the stator so that there is less energy loss. As a consequence, the volume of magnetic material can be reduced when compared with a surface magnet designed under equal conditions otherwise.

In one particular embodiment of the invention, the outer periphery of the body has a convex or concave shape between two adjacent permanent magnets. This serves as an additional measure to control the distribution of the radial component of the electromagnetic induction. In general, the magnetic poles formed between two adjacent permanent magnets can have different shapes to control the distribution of the electromagnetic induction and in particular, different convex or concave shapes.

The present invention also provides a permanent magnet motor comprising a rotor assembly as outlined above as well as an electrical machine comprising a stator assembly as outlined above.

SHORT DESCRIPTION OF THE DRAWINGS

In the following, the invention is described by way of preferred embodiments of the invention with reference to the drawings.

FIG. 3a, 3b, 3c respectively show schematic plan views of three samples of stator sheets for forming the stator assembly according to the present invention; and FIG. 3d shows a schematic plan view of a stator assembly formed from a number of laminated stator sheets.

Figure 4:
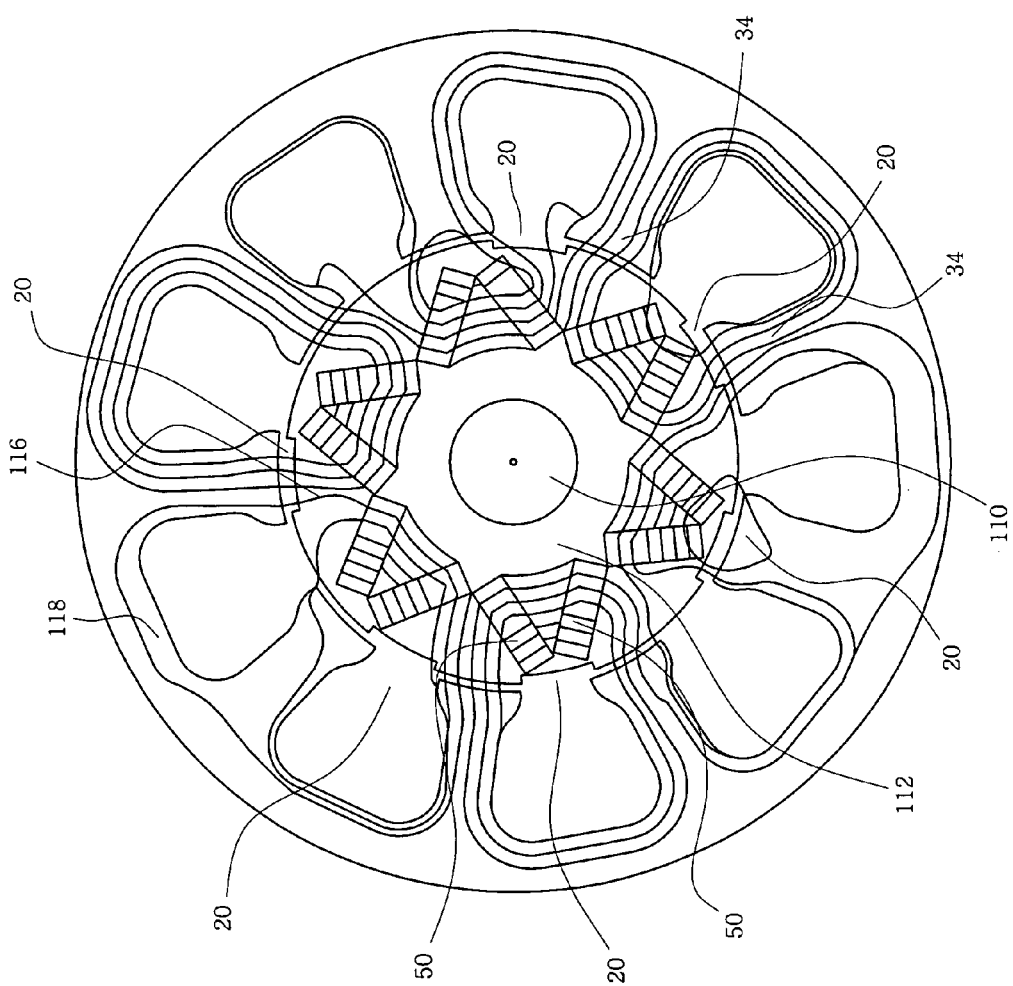

FIG. 4 shows a schematic sectional view through a motor assembly comprising a rotor and a stator according to the present invention wherein the distribution of the magnetic flux is indicated in this figure.

Figure 5:
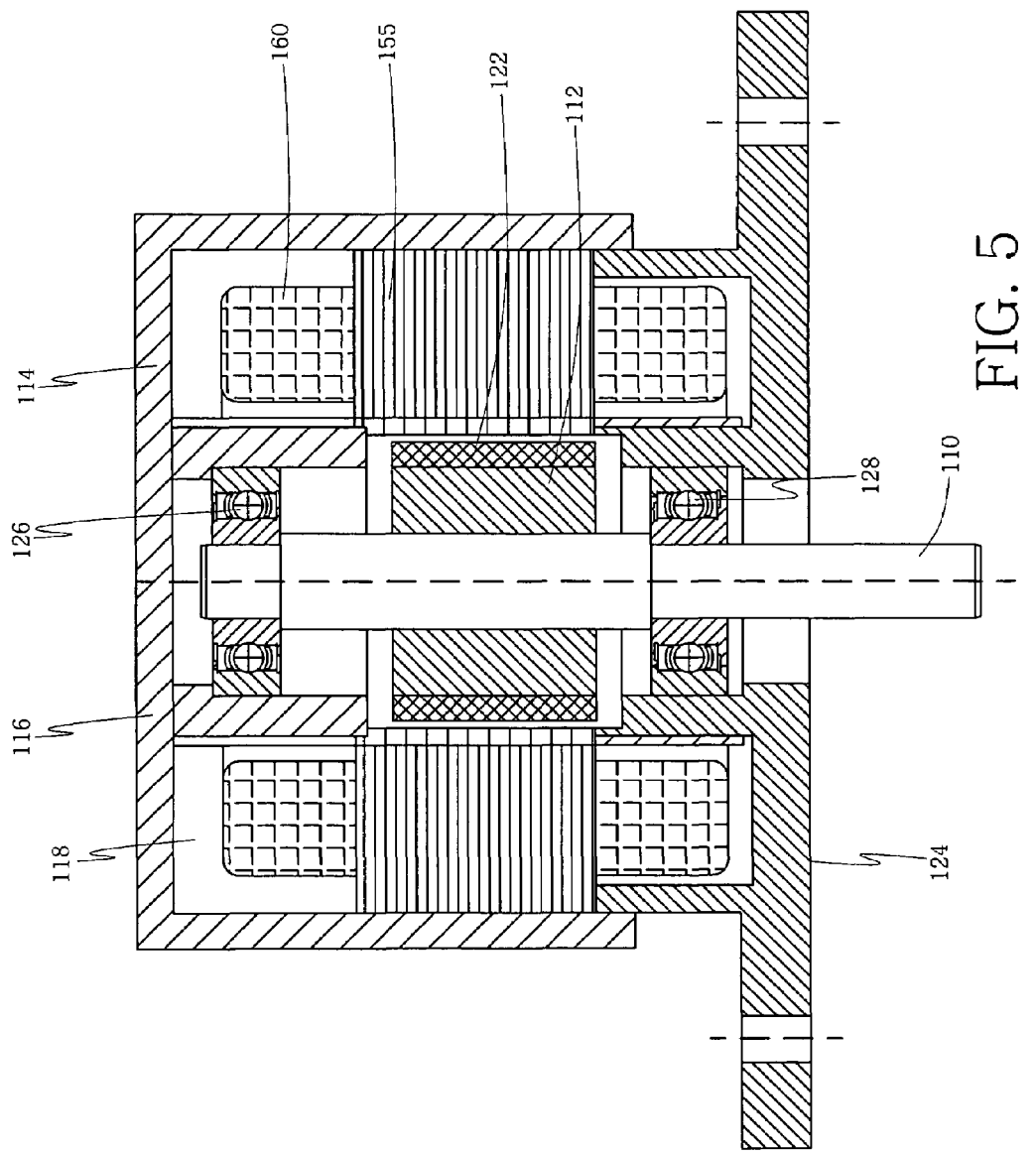

FIG. 5 shows a schematic sectional view in a longitudinal direction through a permanent magnet motor according to the prior art.

DETAILED DESCRIPTION OF PREFERRED EMBODIMENTS

Figure 1:
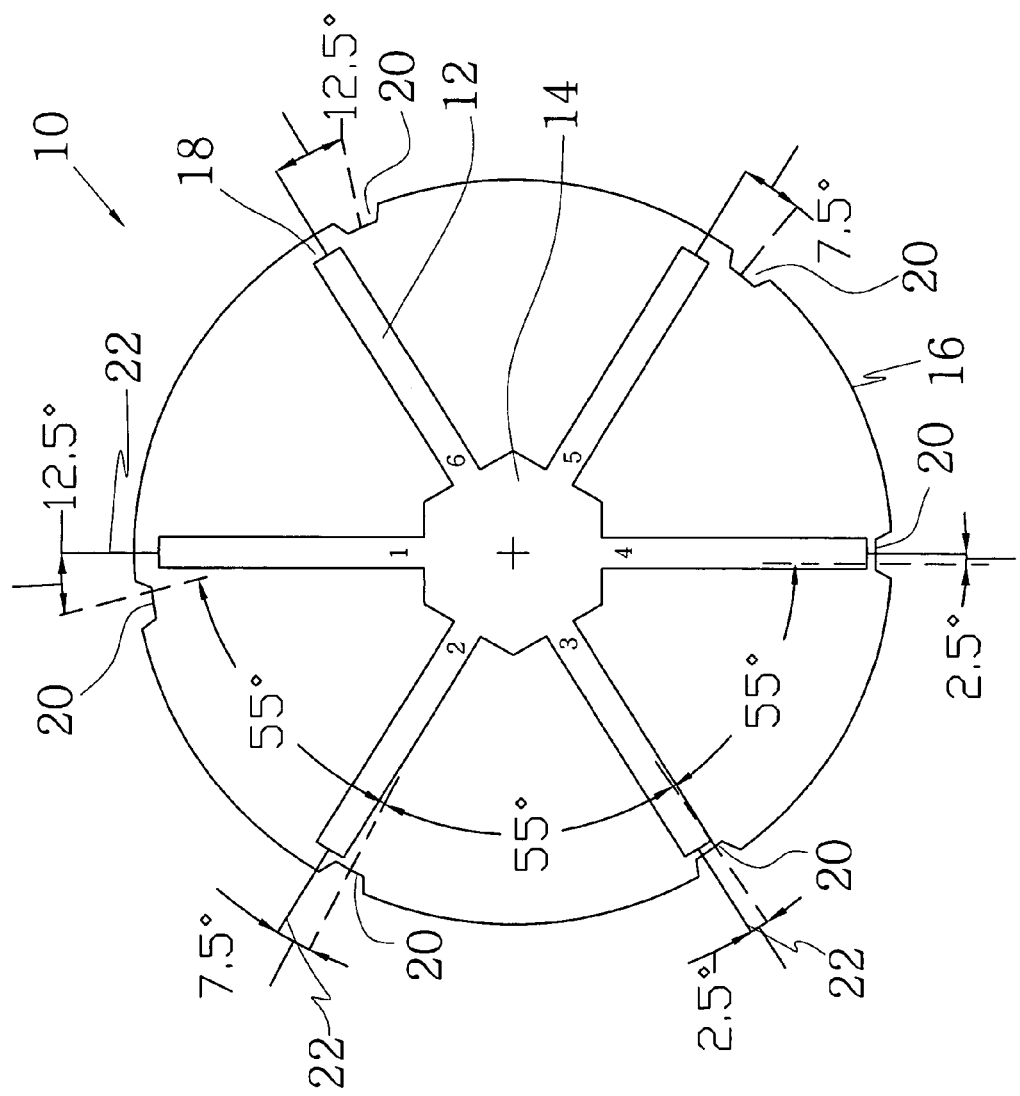
FIG. 1 shows a schematic sectional view through a sample of a cylindrical lamination for forming a rotor assembly according to the present invention.

FIG. 1 schematically shows a sectional view through a lamination for forming a rotor assembly according to the present invention. The lamination 10 forms one axial section of the rotor body, having a generally cylindrical shape comprising slots 12 which radially extend from an inner opening 14 of the rotor body towards the outer periphery 16 thereof. A number of such laminations 10 are arranged on top of each other to form a rotor body having slots which extend radially and axially through the rotor body. Permanent magnets (not shown) will be embedded in the slots, wherein the laminations 10 form a magnetic core as well as a yoke of the rotor assembly. The configuration of the lamination 10 shown in FIG. 1 is adapted for an inner-rotor motor configuration wherein the inner opening 14 may be used for mounting the rotor body on a hub or a shaft. Of course, it is also within the scope of the present invention to provide an outer-rotor configuration in which the features of the rotor assembly have to be turned inside out.

The lamination 10 shown in FIG. 1 comprises six slots for receiving six permanent magnets embedded therein. At the outer periphery 16 of the lamination the slots 12 are closed by bridges 18 which protect the magnets against possible mechanical and electromagnetic damage and which connect the poles on the two sides of each magnet.

Further, according to the present invention, shallow slots or notches 20 are provided in the outer periphery 16 of the lamination 10, in the neighbourhood of the end face of each slot 12 or its respective permanent magnet, facing towards this outer periphery 16. In the context of the present invention, the notches 20 are provided in that surface of the rotor body which is facing the air-gap formed between the rotor and the stator in the electrical machine. In case of FIG. 1, the outer periphery 16 of the lamination 10 will form the air-gap facing surface of the rotor body.

When a number of lamination 10 are bonded to form a rotor body, the shallow slots 20 will in combination form grooves which extend along the length of the rotor body in an approximately axial direction. Preferably, the shallow slots 20 are arranged at irregular angular intervals at this outer periphery 16. As shown in FIG. 1, the notches 20 can be offset from a center-line 22 of each slot 12 by e.g. −12.5°; +12.5°; +7.5°; +2.5°; −2.5°; and −7.5°. Of course, the above angles are only examples of one embodiment of the invention. Also regular intervals can be chosen. The purpose and effect of these notches is to form skewed grooves in the air-gap facing surface of the rotor body, as explained with reference to FIG. 2 below.

Figure 2A:
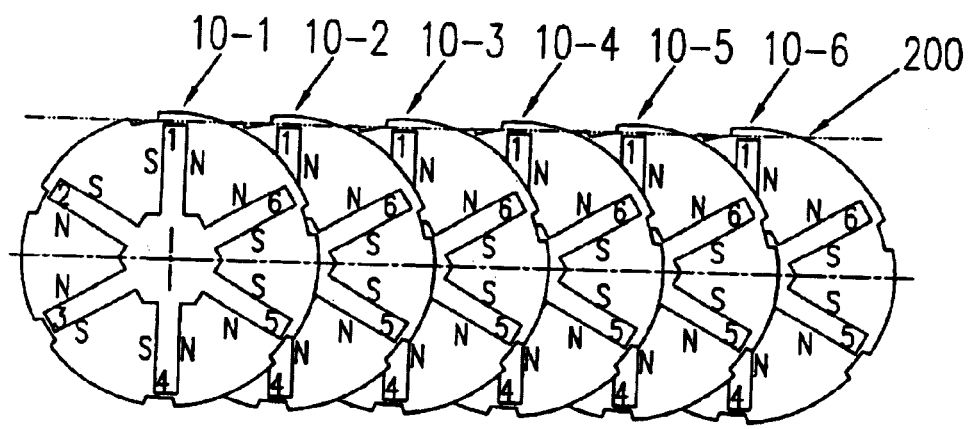
FIGS. 2A and 2B shows a schematic sectional view of a series of laminations which are assembled for forming the rotor assembly according to the present invention.
Figure 2B:
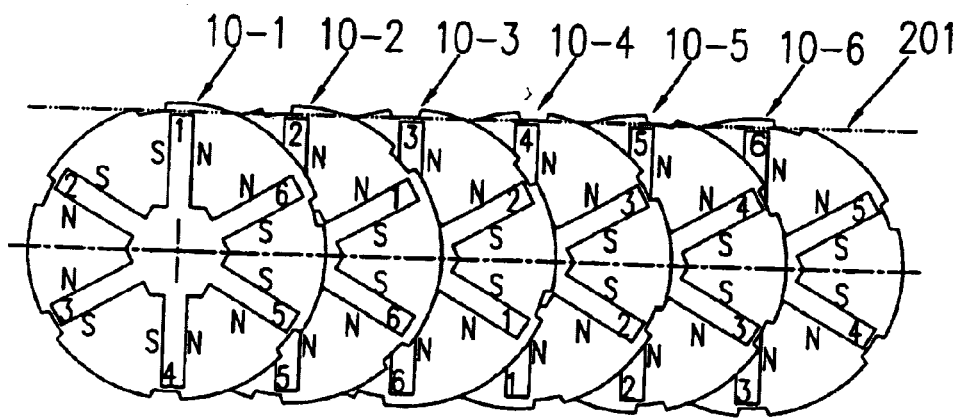

FIGS. 2A and 2B show a schematical veiw of an example of six laminations 10-1, 10-2, 10-3, 10-4, 10-5, 10-6. Each of the limations 10-1 to 10-6 are formed in the same way as the lamiantion 10 shown in FIG. 1. The slots 12 are numbered from 1 to 6. Corresponding numberings may be found in the drawing of FIG. 1. Additionally, in FIGS. 2A and 2B the magnetisation of the core material of the rotor body is indicated by N (North) and S (South) in the drawing.

To form the rotor body according to the present invention a number of laminations are used which corresponds to the number of magnet poles or a suitable multiple or fraction thereof. The laminations used for forming the rotor body need not be identical. However, an expert will understand that the manufacture of the rotor assembly according to the present invention is simplified by using identical laminations.

As shown in FIGS. 2A and 2B, the laminations 10-1 to 10-6 are arranged in series wherein each lamination is turned with respect to its neighbouring lamination by an angle corresponding to the angular distance of two magnet slots 12. Accordingly, when said laminations 10-1 to 10-6 are arranged on top of each other and are bonded to form one rotor body, this rotor body comprises alinged slots 12 for receiving embedded magnets wheich extend axially and radially through the rotor body as well as skewed grooves which are formed from said shallow notches. For this purpose, the notches of the asembled laminations 10-1 to 10-6 are not perfectly aligned but are gradually offset so that they overlap partly and form said skewed grooves having a desired wideth and inclination angle for manipulating the distribution of the magnetic flux created by the permanent magnet. In other words, the laminations 10-1 to 10-6 are designed and arranged to provide slots 12 which are aligned in an axial direction to receive embedded magnets and misaligned notches 20 to form skewed grooves along the outer peripherey of the rotor body in an approximately axial direction. In FIG. 2A the groove 200 to be formed by the notches 20 are aligned with the axis, in FIG. 2B the groove 201 to be formed by the notches 20 are not aligned with the axis.

An expert will understand that the above is only one example for forming skewed grooves according to the present invention. For example, a rotor body having embedded magnets could be formed in a conventional manner and, subsequently, skewed grooves could be formed on the air-gap facing side of the rotor body e.g. by milling or another type of machining.

FIGS. 3a, 3b, 3c and 3d show another aspect of the present invention in which skewed grooves are provided in the air-gap facing end faces of the poles of a stator body.

FIGS. 3a, 3b and 3c each show one lamination sheet 30-1, 30-2, 30-3 for forming a stator body according to the present invention. Each lamination sheet comprises a stator yoke 32 and a number of stator poles or teeth 34. In the end faces of the stator poles 34 facing an air-gap which is formed between the stator and a rotor of the electrical machine, shallow slots or notches 36 are formed at irregular or regular angular intervals, similar to the way the shallow notches 20 are formed in the lamination 10 of the rotor assembly. In the embodiment of FIG. 3, the grooves or slots are formed in the stator poles 34 at a position which has an increasing distance to a centreline of each stator pole. For example, the first notch is formed in the middle of one stator pole. The second notch is formed at a position which deviates from the centreline of the neighbouring pole by 2,5 degrees. The third notch is formed at a position which deviates from the centreline of the next neighbouring stator pole by 5 degrees, etc. The number of stator sheets 30-1, 30-2, 30-3 can be determined by the designer of the stator assembly based on his/her experience.

An example of a stator assembly 38 formed from a plurality of stator sheets is shown in FIG. 3d. In this embodiment, the stator assembly 38 may be formed from identical laminations 30-1, 30-2, 30-3 which are rotated relative to each other as explained above with reference to FIG. 2 so that the shallow notches 36 will formed skewed grooves 40 extending along the length of the end faces of the poles 42 in an approximately axial direction of the stator assembly 38. By appropriately choosing the width of the notches 36 as well as the length and inclination angle of the skewed grooves 40 it is possible to manipulate the distribution of the magnetic flux in the air-gap, in particular to reduce or eliminate the cogging torque effect.

FIG. 4 shows a schematic sectional view through the electrical machine according to the invention for illustrating the magnetic flux passing through the magnetic core formed from the rotor body and the stator. In the rotor body 116 shown in FIG. 4, the embedded permanent magnets 50 are arranged in a different way from the embodiments of FIGS. 1 and 2. The grooves on the outer surface of the rotor 116 are shown at 20. FIG. 4 shows how the grooves 20 influence the radial distribution of the magnetic flux and, in particular, create a flux concentration effect at some of the stator poles 34 to reduce the cogging torque. An expert will understand that the width, depth and inclination of the grooves can be varied and, in particular, the grooves can be made wider or narrower and the inclination angle can be changed for adjusting the induction and the cogging torque according to the particular needs of the application.

The features disclosed in the above specification, the claims and the drawings can be relevant for implementing the various embodiments of the present invention when taken alone or in any combination thereof.

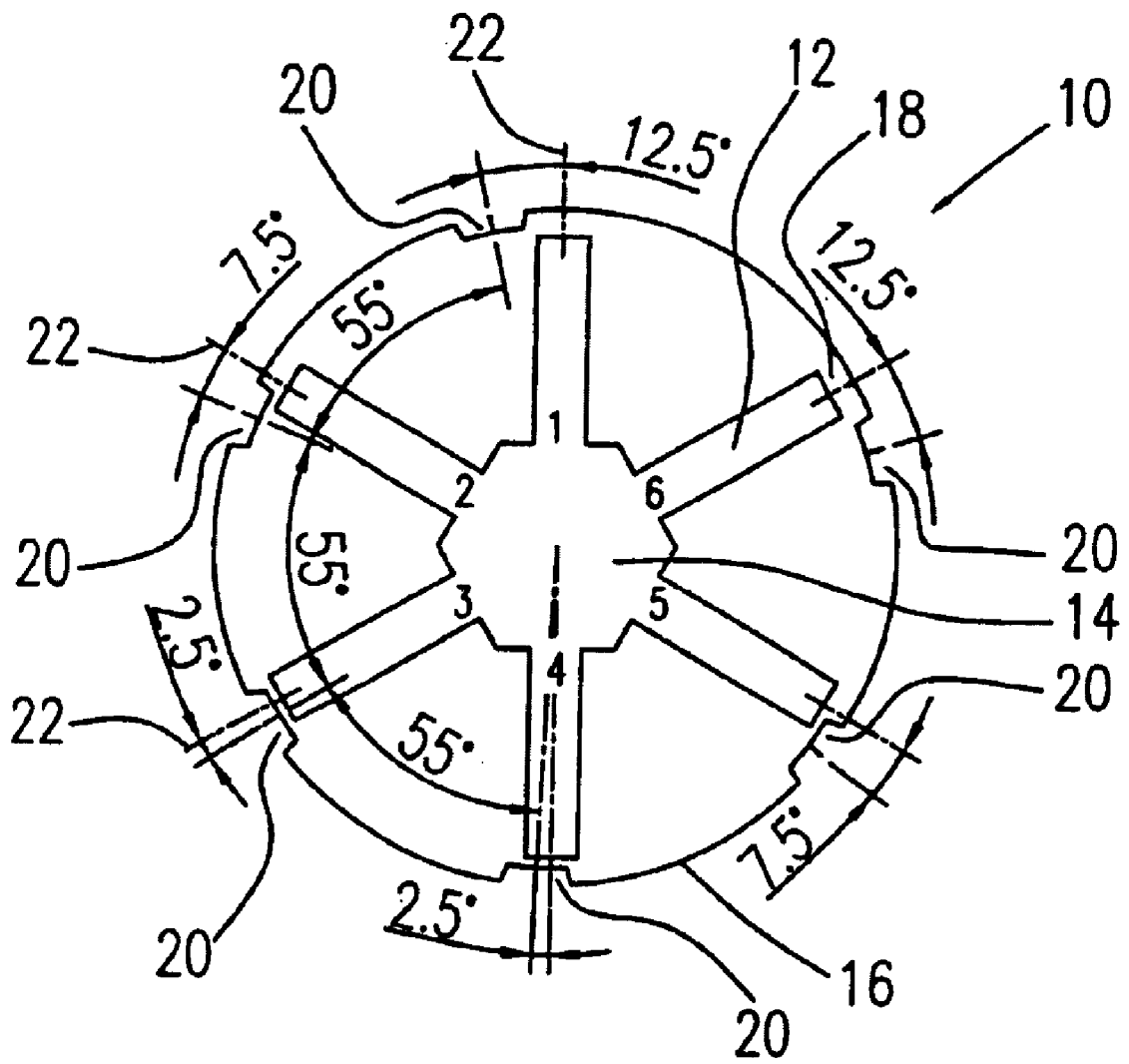

What is claimed is:

1. A Rotor assembly for an electrical machine, comprising:
    a rotor body of substantially cylindrical shape having an outer surface facing an gap between the rotor assembly and a stator of the electrical machine, and
    a plurality of permanent magnets embedded in said rotor body,
    wherein the outer surface of the rotor body defines a plurality of grooves for manipulating the distribution of magnetic flux of said permanent magnets,
    wherein said plurality of grooves are each at irregular angular intervals from each other.

2. The rotor assembly according to claim 1, wherein the embedded magnets extend substantially radially through said rotor body.

3. The rotor assembly according to claim 1, wherein at least one of said plurality of grooves axially extends along the outer surface of the rotor body.

4. The rotor assembly according to claim 1, wherein the rotor body further comprises a plurality of cylindrical laminations (10).

5. A Stator assembly for an electrical machine, comprising:
    a stator body of having stator poles (42), said stator poles (42) having end faces facing an air-gap between the stator assembly and a rotor of the electrical machine,
    wherein a plurality of grooves (40) are formed in said end faces of said stator poles (42). and wherein the plurality of grooves are each at irregular angular intervals from each other.

6. The Stator assembly according to claim 5, wherein at least one of the plurality of grooves (4O) is skewed.

7. The Stator assembly according to claim 5, wherein the stator body further comprises a plurality of laminated sheets (30), each sheet including a yoke section (32) and stator pole sections (34).

8. The rotor assembly according to claim 1, wherein said plurality of grooves are disposed about an end face of at least one of said permanent magnets.

9. The rotor assembly according to claim 4, wherein each lamination includes at least one notch (20) on a surface thereof.

10. The rotor assembly according to claim 9, wherein a plurality of laminations each including at least one notch are arranged on the rotor body to form at least one of said plurality of grooves (20).

11. The rotor assembly according to claim 10, wherein said at least one of said plurality of grooves is axially aligned with an axis of the rotor.

12. The rotor assembly according to claim 10, wherein said at least one of said plurality of grooves (2O) is not axially aligned with an axis of the rotor.

13. The rotor assembly according to claim 10, wherein said at least one of said plurality of grooves is skewed with respect to an axis of the rotor.

14. The Stator assembly according to claim 5, wherein the at least one of said plurality of grooves extends along the length of said end faces (42) about the axial direction of the stator body.

15. The Stator assembly according to claim 7, wherein the end face of at least one pole section defines a notch (36).

16. The Stator assembly according to claim 15, wherein said laminated sheets (30) are arranged such that the at least one groove (40) extends along an axial length of the stator assembly.

17. The Stator assembly according to claim 15, wherein said at least one groove (40) extending along the axial length of the stator assembly is skewed.

18. The Stator assembly according to claim 5, further comprising a rotor.

19. The Rotor assembly according to claim 1, further comprising a stator.

20. An electrical machine comprising a substantially cylindrical stator 118 concentrically aligned with a rotor 116, the outer surface of the rotor 116 and the inner surface of the stator 118 defining a substantially cylindrical gap, the gap having a plurality of protrusions 20 for manipulating an internal magnetic flux wherein said plurality of protrusions are each are each at irregular angular intervals from each other.

21. The electrical machine of claim 20, wherein the plurality of protrusions are defined by a groove in at least one of the outer surface of the rotor or the inner surface of the stator.

22. The electrical machine of claim 20, wherein the stator further comprises at least one stator pole.

23. The electrical machine of claim 20, wherein the plurality of protrusions extend axially along the length of the gap.

24. The electrical machine of claim 20, wherein the plurality of protrusions skewedly extend along the length of the gap.

25. An electric motor comprising a stator substantially housing a rotor, the rotor having an outer surface and a body, the body adapted to receive at least one magnetic element (12) and the outer surface having a plurality of notches (20) formed thereon wherein the plurality of notches are randomly distributed on the outer surface (16) of the rotor.

26. The electric motor of claim 25, wherein the rotor further comprises several layers (10) of lamination.

27. The electric motor of claim 25, wherein the plurality of notches (20) form grooves along an axial length of the rotor.

28. The electric motor of claim 27, wherein at least one of the grooves is skewed with respect to an axis of the motor.

29. An electric motor comprising a stator (38) for receiving a rotor, the stator (38) having a plurality of poles 34 stemming from the stator body toward the rotor, the rotor having an outer surface facing the plurality of poles; wherein at least-two of said plurality of poles define grooves (40) at an end surface facing the outer surface of the rotor, and, wherein said grooves are each at irregular angular intervals from each other.

30. The electric motor of claim 29, wherein at least one of the groove extends axially along an axis of the stator.

31. The electric motor of claim 29, wherein at least one of the groove extend skewedly along an axis of the stator.

32. The electric motor of claim 29, wherein the grooves manipulates a magnetic flux of the rotor.

* * * * *

UNITED STATES PATENT AND TRADEMARK OFFICE
CERTIFICATE OF CORRECTION

PATENT NO. : 6,967,424 B2
APPLICATION NO. : 10/758109
DATED : November 22, 2005
INVENTOR(S) : Vladimir Vladimirovich Popov It is certified that error appears in the above-identified patent and that said Letters Patent is hereby corrected as shown below:

In the drawings:

in Figure 1 show the angles indicated as 2.5, 7.5 and 12.5 degrees measured between the center line of the slots 12 and the center line of the shallow notches 20. A corrected Figure 1 is shown on attachment page 2 of 3;

in Figure 2a show groove 200 to be in the same tangential position with regard to the slots of laminations 10-1, 10-2, 10-3, 10-4, 10-5 and 10-6. A corrected Figure 2a is shown on attachment page 3 of 3; and in Figure 2b show groove 201 to be in the same tangential position with regard to the slots of laminations 10-1, 10-2, 10-3, 10-4, 10-5 and 10-6. A corrected Figure 2b is shown on attachment page 3 of 3.

Signed and Sealed this

Third Day of October, 2006

JON W. DUDAS
*Director of the United States Patent and Trademark Office*